United States Patent Office 3,144,417
Patented Aug. 11, 1964

3,144,417
POLYMERIZATION OF EPOXIDES
Frederick E. Bailey, Jr., Charleston, and Haywood G. France, South Charleston, W. Va., assignors to Union Carbide Corporation, a corporation of New York
No Drawing. Filed June 2, 1959, Ser. No. 817,487
7 Claims. (Cl. 260—2)

This invention relates to a process for polymerizing epoxide compounds and to the products resulting therefrom.

In its broad aspect this invention is directed to the process for homopolymerizing N-(2,3-epoxypropyl)tertiary amine, or copolymerizing N-(2,3-epoxypropyl)tertiary amine with a vicinal-epoxy hydrocarbon which is free of unsaturation other than aromatic unsaturation to produce useful polymers. The terms "N-(2,3-epoxypropyl) tertiary amine" and "vicinalepoxy hydrocarbon free of unsaturation other than aromatic unsaturation" as well as the various catalysts which can be employed to effect the polymerization reaction will be described in detail at a more appropriate section of this specification.

The novel homopolymers and copolymers resulting from the reaction can vary from viscous liquids to high molecular weight solids. The novel copolymers can be water-soluble or water-insoluble depending upon the quantity of ethylene oxide copolymerized therein. For instance, the novel copolymers of this invention comprising less than 50 weight percent of oxyethylene groups are essentially water-insoluble; those copolymers comprising greater than 50 weight percent of oxyethylene groups are water-soluble to a substantial degree, and this water-solubility characteristic becomes more pronounced with copolymers containing proportionately greater amounts of oxyethylene groups therein. Hence, one apparent advantage afforded by the practice of the instant invention is the preparation of novel copolymers whose physical characteristics can be "tailor-made" to fit desired fields of applications and uses especially where the water-solubility characteristic is of paramount importance, e.g., in the preparation of films from aqueous solution, in the coatings field, in the water thickening and lubricating fields, and the like.

Accordingly, one or more of the following objects will be achieved by the practice of this invention.

It is an object of this invention to provide a novel process for homopolymerizing an N-(2,3-epoxypropyl) tertiary amine to produce useful polymers. It is another object of this invention to provide a novel process for copolymerizing an admixture containing an N-(2,3-epoxypropyl)tertiary amine and a vicinal-epoxy hydrocarbon free of unsaturation other than aromatic unsaturation to produce useful, novel copolymers. A further object of this invention is to provide novel copolymers, the properties and characteristics of which can be "tailor-made" to fit a wide variety of uses and fields of applications. Other objects will become apparent to those skilled in the art in the light of the instant specification.

The N-(2,3-epoxypropyl)tertiary amines contemplated as monomeric reagents in the polymerization reaction can be expressed by the following formula:

(I)
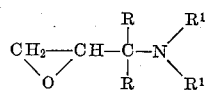

wherein each R, individually, can be hydrogen or alkyl; and wherein each R[1], individually, is a hydrocarbon group free of unsaturation other than benzenoid unsaturation, e.g., alkyl, aryl, alkaryl, aralkyl, and cycloalkyl, with the proviso that both R[1] variables together with the amino nitrogen atom (in Formula I above) can represent a saturated heterocyclic nucleus which contains from 2 to 6 carbon atoms in addition to said amino nitrogen atom. Illustrative radicals for the R variables include, for example, methyl, ethyl, propyl, butyl, isobutyl, amyl, n-hexyl, n-octyl, 2,4-dimethyloctyl, dodecyl, and the like. It is preferred that each R, individually, contains less than 5 carbon atoms. In a highly preferred aspect each R is hydrogen. Representative R[1] radicals include, among others, methyl, ethyl, propyl, isopropyl, butyl, isobutyl, t-butyl, isoamyl, 3-methylhexyl, 2,4-dimethyloctyl, dodecyl, cyclobutyl, cyclopentyl, cyclohexyl, cycloheptyl, alkylcycloalkyl, phenyl, benzyl, o-, m-, and p-tolyl, phenethyl, phenylpropyl, and the like. When both R[1] variables, collectively, designate a divalent saturated aliphatic hydrocarbon radical, the amino nitrogen atom together with said divalent saturated aliphatic hydrocarbon radical represent a saturated heterocyclic nucleus, for example, the azacycloalkyls, i.e.,

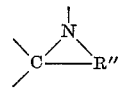

wherein R″ is a divalent saturated aliphatic hydrocarbon radical such that a saturated heterocyclic nucleus is formed which contains from 2 to 6 carbon atoms. Each of the two unsatisfied carbon valences of the azacycloalkyl structurally depicted immediately above can be hydrogen or alkyl. Illustrative of the azacycloalkyl radicals which are contemplated include, for example, 1-azacyclopropyl, 1-azacyclobutyl, 1-pyrrolidyl, 1-piperidyl, hexamethylenimino, the alkyl-substituted azacycloalkyl, e.g., 1-(2-ethyl-4-propylpyrrolidyl), 1-(2-butyl-5-hexylpiperidyl), 1-(2-methyl-5-ethylpiperidyl, 1-(2,4-dimethylpyrrolidyl), and the like. It is to be understood that the "tertiary amine" portion of the term "N-(2,3-epoxypropyl)tertiary amine," as used herein, signifies that the three bonds of the nitrogen atom are satisfied in the following manner: (1) one bond is satisfied by the N-(2,3-epoxypropyl) group and each of the remaining two bonds is separately satisfied by individual hydrocarbon groups as illustrated previously, or (2) one bond is satisfied by the N-(2,3-epoxypropyl) group and each of the remaining two bonds is separately attached to different carbon atoms which (carbon atoms) are continuously linked and form with the amino nitrogen atom a saturated heterocyclic nucleus containing from 2 to 6 carbon atoms. In passing, when the N-(2,3-epoxypropyl)tertiary amines fall within (2) above, it should be noted that the resulting compounds have been referred to as cyclic amines.

Illustrative of the N-(2,3-epoxypropyl)tertiary amines which can be employed include, for example, N-(2,3-epoxypropyl)-dimethylamine, N-(2,3-epoxypropyl)-dipropylamine, N-(2,3 - epoxypropyl)-N-benzyl-n-octylamine, N-(1-methyl-2,3-epoxypropyl)-N-phenyl - 2 - ethylhexylamine, N-(1-ethyl-2,3-epoxypropyl)-N-cyclopentyl - isoamylamine, N-(2,3-epoxypropyl)-N-m-tolyl-benzylamine, N-(2,3-epoxypropyl)-N-isopropyl-n-dodecylamine, N-(1-propyl-2,3-epoxypropyl) - diphenylamine, N-(2,3-epoxypropyl)-N-cyclohexyl-phenethylamine, N-(2,3-epoxypropyl)-ethylenimine, N-(2,3-epoxypropyl)-2-ethyl-4-propylpyrrolidine, N-(1-butyl-2,3-epoxypropyl)-2-methyl-5-ethylpiperidine, N-(2,3-epoxypropyl) - piperidine, N-(2,3-epoxypropyl)-hexamethylenimine, and the like.

The preparation of the N-(2,3-epoxypropyl)tertiary amines is well known in the art. For instance, a saturated secondary amine such as dimethylamine, piperidine, pyrrolidine, N-ethyl-benzylamine, and the like can be reacted with one mol of 1-chloro-2,3-epoxyalkane, e.g., epichlorohydrin, the reaction being carried out in bulk or in a solvent such as an alkanol or an alkanol-water mixture. The N-(2,3-epoxypropyl)tertiary amine is formed by the subsequent addition of aqueous base to the reaction mixture.

The monomeric vicinal-epoxy hydrocarbon free of unsaturation other than benzenoid unsaturation, i.e., a vicinal-epoxy hydrocarbon which has a single vicinal epoxy group and which is free of unsaturation other than benzenoid unsaturation, employed in the practice of the instant invention can be characterized by the following structural formula:

(II) 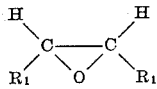

wherein each $R_1$, individually, can be hydrogen or a hydrocarbon radical free of unsaturation other than benzenoid unsaturation such as, for example, alkyl, aryl, aralkyl, alkaryl, or cycloalkyl radicals. In addition, both $R_1$ variables together with the epoxy carbon atoms, i.e., the carbon atoms of the epoxy group,

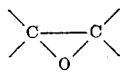

can represent a saturated cycloaliphatic hydrocarbon nucleus which contains from 4 to 10 carbon atoms, preferably from 4 to 8 carbon atoms, for example, a saturated cycloaliphatic hydrocarbon nucleus derived from cycloalkane, alkyl substituted-cycloalkane, cyclobutane, cyclopentane, cyclohexane, cycloheptane, cyclooctane, 3-methylcyclopentane, 3-amylcyclohexane, and the like. Illustrative $R_1$ radicals include, among others, methyl, ethyl, propyl, butyl, isobutyl, hexyl, isohexyl, 3-propylheptyl, dodecyl, octadecyl, phenyl, benzyl, tolyl, phenethyl, phenylpropyl, cyclopentyl, cyclohexyl, 2-methylcyclohexyl, cycloheptyl, 2-butylpentyl, and the like.

Representative vicinal-epoxy hydrocarbon monomers which can be employed include, for example, ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 5-benzyl-2,3-epoxyheptane, 4-cyclohexyl-2,3-epoxypentane, styrene oxide, ortho-, meta-, and para-ethylstyrene oxide, benzylethylene oxide, chlorostyrene oxide, the oxabicycloalkanes, e.g., 7-oxabicyclo[4.1.0]heptane, 6-oxabicyclo[3.1.0]hexane, 4-propyl-7-oxabicyclo[4.1.0]heptane, 3-amyl-6-oxabicyclo[3.1.0]hexane; alkyl-substituted oxabicycloalkanes; and the like. In a preferred aspect, the vicinal-epoxy hydrocarbon is a lower olefin oxide, e.g., ethylene oxide, propylene oxide, the epoxybutanes, the epoxypentanes, and the like.

Among the classes of catalysts which can be employed to effect the polymerization reaction are organometallic compounds characterized by the following formula:

(III) $\qquad R'MR''_a$ wherein M is a Group II or III metal, for example, magnesium, beryllium, zinc, calcium, strontium, barium, cadmium, aluminum, indium, gallium, and the like; wherein $a$ is an integer greater than zero and less than 3 and depends for its value upon the valence of the metal (M); wherein R' is an alkoxy, aryloxy, or hydrocarbon radical free from ethylenic and acetylenic unsaturation, e.g., alkyl, aryl, cycloalkyl, alkaryl, or aralkyl; and wherein R'' (or each R'', individually, when M has a valence of 3) is a halogen, e.g., chlorine, iodine, fluorine, bromine; aryloxy; alkoxy; or a hydrocarbon radical free from ethylenic and acetylenic unsaturation, e.g., alkyl, aryl, cycloalkyl, aralkyl, or alkaryl. Illustrative R' and R'' radicals include, among others, methoxy, propoxy, butoxy, hexoxy, 2-methyloctoxy, 2,4-diethyldodecoxy, phenoxy, 2-butylphenoxy, 3-propylphenoxy, methyl, butyl, 2-ethylhexyl, 2,2,4-trimethyloctyl, dodecyl, octadecyl, phenyl, tolyl, xylyl, phenethyl, phenylpropyl, phenylbutyl, benzyl, cyclopentyl, cyclohexyl, 3-propylcyclohexyl, cycloheptyl, alkyl-substituted cycloalkyl, and the like. It is preferred that each R' and R'' contain less than 12 carbon atoms.

Illustrative subclasses of organometallic catalysts characterized by Formula III supra which can be employed in the instant invention include, for example, dialkylzinc, alkylzinc halide, dialkoxyzinc, alkylzinc alkoxide, trialkylaluminum, alkylaluminum dihalide, trialkoxyaluminum, diaryloxyaluminum halide, dialkylaluminum alkoxide, dialkylaluminum halide, dialkylmagnesium, alkyl-arylmagnesium, alkylmagnesium halide, alkylberyllium halide, alkylcycloalkylberyllium, dialkylcadmium, diarylindium halide, trialkylindium, trialkylgallium, alkylarylindium halide, and the like. Specific examples of the organometallic catalysts include, among others, dibutylzinc, butylzinc chloride, dipropoxyzinc, octylzinc butoxide, diphenylzinc, triisobutylaluminum, trioctadecylaluminum, hexylaluminum dibromide, diethylaluminum chloride, trioctoxyaluminum, diphenoxyaluminum bromide, dipropylaluminum methoxide, dibutylmagnesium, propylphenylmagnesium, ethylmagnesium iodide, ethylberyllium chloride, diisopropylcadmium, diphenylindium iodide, triisobutylindium, diethylpropylgallium, trimethylgallium, and the like.

A second class of catalysts which can be employed in the process of the present invention are certain divalent metal amide-alcoholates characterized by the following formula:

IV $\qquad H_2N\text{---}M\text{---}OR$ wherein M is a divalent metal which has an atomic number greater than 4 and less than 57 from Group II of the periodic table, i.e., magnesium, calcium, zinc, strontium, cadmium, and barium; and wherein R is a monovalent organic radical, preferably a monovalent hydrocarbon radical, e.g., alkyl, cycloalkyl, aryl, alkaryl, aralkyl, and the like. Representative R radicals include, among others, methyl, ethyl, propyl, isopropyl, butyl, isobutyl, t-butyl, 2-ethylhexyl, 2,4,4-trimethylpentyl, decyl, dodecyl, cyclopentyl, cyclohexyl, 2-methylcyclopentyl, 3-amylcyclohexyl, phenyl, benzyl, tolyl, ethylphenyl, hexylphenyl, octyphenyl, phenethyl, phenylpropyl, phenylbutyl, and the like. In a preferred aspect the R variable is an alkyl radical which contains from 1 to 10 carbon atoms. It is further preferred that the divalent metal (M) be an alkaline earth metal, i.e., calcium, strontium, or barium. Of the alkaline earth metals calcium is highly preferred.

The divalent metal amide-alcoholate catalysts of this invention can be prepared by various routes. Explanation of the catalyst preparation will be facilitated by illustrating the various chemical equations involved. In these equations the metal will be exemplified by calcium, and the organic reactant will be designated as a specific compound be it an alcohol, an epoxide, or an aldehyde. It is to be understood, however, that other divalent metals can be employed instead of calcium, and other organic reactants can be used instead of the illustrated organic reactant as will be readily apparent from a consideration of this specification.

In one embodiment the alkaline earth metal amide-alcoholate catalysts can be prepared by the reaction of an epoxide compound, i.e., an epoxide compound which contains a cyclic group composed of two carbon atoms and one oxygen atom, with solid metal hexammoniate or with an ammonia solution of metal hexammoniate as shown in Equation V below.

(V) 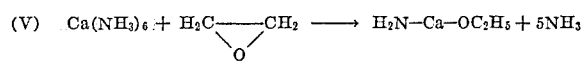

In practice, the above reaction is most conveniently carried out by dissolving the metal in liquid ammonia followed by slow addition of the epoxide compound to the resulting agitated solution. The reaction can be conducted at a temperature in the range of from about $-70°$ C., and lower, to about $+30°$ C., and higher. In the event an inert vehicle (described below) is employed, the lower temperature limit is above the melting point of said vehicle. It is understood, of course, that whenever liquid ammonia is employed as a reactant and/or vehicle, the temperature of the liquid ammonia is below about −33.4° C. at atmospheric pressure, or the temperature and pressure are correlated to thus essentially maintain the ammonia in the liquid state. Alternatively, ammonia can be reacted with alkaline earth metal contained in an inert, normally-liquid organic vehicle such as lower dialkyl ether of alkylene glycol, for example, the dimethyl, diethyl or dipropyl ethers of diethylene glycol, and the like; dioxane; saturated aliphatic and cycloaliphatic hydrocarbons, e.g., hexane, heptane, cyclohexane, and the like. When this procedure is followed the alkaline earth metal is added to the inert vehicle while agitating the resulting mixture. Subsequently, ammonia is slowly added to this mixture while maintaining a reaction temperature preferably below about 10° C. to assure formation of the metal hexammoniate. After this, the metal hexammoniate suspension in the inert vehicle can be reacted with the desired epoxide compound to form the metal amide-alcoholate.

With reference to Equation V supra particularly desirable epoxide reagents are those containing solely oxirane oxygen, carbon, and hydrogen, or solely oxirane oxygen, etheric oxygen, carbon, and hydrogen, said epoxide reagents containing a cyclic group composed of two carbon atoms and one oxygen atom which can be a terminal cyclic group or an internal cyclic group. Illustrative epoxides include, for example, ethylene oxide, propylene oxide, 1,2-epoxybutane, 2,3-epoxybutane, isobutylene oxide, the epoxypentanes, the epoxyhexanes, the epoxyoctanes, the epoxydecanes, styrene oxide, cyclohexylepoxyethane, 1-phenyl-1,2-epoxypropane, 7-oxabicyclo[4.1.0]heptane, 6-oxabicyclo[3.1.0]hexane, 3-methyl-6-oxabicyclo[3.1.0]-hexane; the 2,3-epoxyalkyl alkyl ethers, e.g., 2,3-epoxypropyl methyl ether, 2,3-epoxypropyl ethyl ether, 2,3-epoxypropyl propyl ether, 2,3-epoxypropyl butyl ether, 2,3-epoxypropyl 2-ethylhexyl ether, 2,3-epoxybutyl ethyl ether, 2,3-epoxypentyl butyl ether; and the like.

According to Equation V, one mol of epoxide can react with one mol of metal hexammoniate to give the metal amide-alcoholate. It has been observed, however, that very active catalysts are obtained by reacting less than one mol of epoxide with one mol of metal hexammoniate. In such preparations the unreacted metal hexammoniate in the reaction product ultimately decomposes to the corresponding metal amide. The end result is a mixture of metal amide and metal amide-alcoholate which mixture, as indicated previously, is an exceedingly active catalyst for polymerizing epoxide monomers.

The divalent metal amide-alcoholate catalysts also can be prepared by the reaction of a monohydroxy organic compound with metal amide or metal hexammoniate as illustrated by Equations VI and VII below.

VI  $Ca(NH_3)_6 + HOC(CH_3)_3$
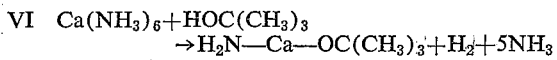

VII  $Ca(NH_2)_2 + HOC(CH_3)_3$
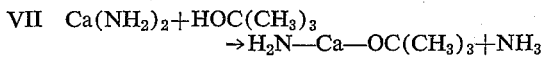

Equation VI is applicable to alkaline earth metal hexammoniates preferably dissolved in liquid ammonia whereas in Equation VII the reagent can be a divalent metal amide wherein the metal portion has an atomic number greater than 4 and less than 57 from Group II of the periodic table. The reactions illustrated by Equations VI and VII can be conducted at a temperature in the range of from about −70° C., and lower, to about +60° C., and higher. Of course, when an inert, normally-liquid vehicle is employed, the lower temperature limit is above the melting point of said vehicle.

A further preparation of the metal amide-alcoholate catalysts is by the reaction of a saturated aliphatic aldehyde with alkaline earth metal hexammoniate, preferably in a liquid ammonia medium, according to the following equation.

(VIII)

The reaction can be conducted at a temperature in the range of from about −70° C., and lower, to about +60° C., and higher. When employing an inert, normally-liquid vehicle, the lower temperature limit is above the melting point of said vehicle.

A third class of compounds useful as catalysts in the instant polymerization reaction are the carbonates of divalent metals which have an atomic number greater than 11 and which are found below potassium and above tin in the Electromotive Force Series of Elements.[1] These divalent metals include, magnesium, calcium, strontium, barium, zinc, cadmium, iron, cobalt, nickel, chromium, and manganese. Particularly preferred metal carbonates are the Group IIA metal carbonates, i.e., the calcium, strontium, or barium carbonates; Group IIB metal carbonates, i.e., the zinc or cadmium carbonates; manganous carbonate; and magnesium carbonate.

It has been observed that the divalent metal carbonates should contain an amount of sorbed water, i.e., adsorbed or absorbed water, which is sufficient to significantly activate or to impart significant catalytic activity to said metal carbonates. The phenomenon regarding sorbed water contained by the metal carbonates is not entirely understood at this time nor is it the desire of the inventors to be bound by any theories regarding adsorption or absorption phenomena. It is sufficient to say that the sorbed water contained by the metal carbonate is firmly tied thereto such that air-drying the metal carbonate for several days at room temperature or slightly above room temperature does not result in any essential weight loss of the sorbed water content in the metal carbonate. The sorbed water bound to the metal carbonates stand in contradistinction to a physical mixture of water and metal carbonate, e.g., an aqueous slurry of metal carbonate, in which latter case the water can be considered to be extraneous water or non-sorbed water. Thus, air-drying a physical mixture of water and metal carbonate results in the removal of the extraneous water or non-sorbed water content from said mixture.

The optimum amount of sorbed water to be contained by the metal carbonates is a natural limit and is governed, to a great extent, by various factors such as the particular metal carbonate contemplated, the method by which the metal carbonate was prepared, the surface area and sorptive characteristics of the metal carbonate, the operative conditions of the polymerization reaction, and other considerations. In general, the greater the surface area of the metal carbonate, the greater the amount of water which can be adsorbed and/or absorbed. As is readily understood, the more hydrophilic metal carbonates, e.g., zinc carbonate, tend to hold greater amounts of sorbed water than those metal carbonates in which the hydrophilic characteristics are slight, e.g., strontium carbonate.

Since the instant invention contemplates the use of several divalent metal carbonates as novel catalysts in the polymerization reaction, and further, since various factors or considerations will influence the optimum weight range of the sorbed water content in the metal carbonates, no simple rule of thumb can be expounded regarding an overall weight range of sorbed water content which should be contained by the metal carbonate catalysts. However, by following the illustrative teachings set forth in this specification one skilled in the art can readily determine by routine experimentation the amount of sorbed water which is necessary to impart optimum catalytic activity to the metal carbonate.

It has been observed that divalent metal carbonates which have been prepared in aqueous media and subsequently dried (by air-drying under reduced pressure at slightly elevated temperatures, until they tend to be essentially free-flowing powders or until they can be so ren-

---

[1] Handbook of Chemistry and Physics, 38th edition, page 1660; published by Chemical Rubber Publishing Co., Cleveland, Ohio.

dered such as by grinding, but not substantially beyond that point) will result in a catalytically activated metal carbonate. In other words, there is obtained a metal carbonate which contains an amount of sorbed water which is sufficient to significantly activate an otherwise essentially inactive metal carbonate. Moreover, a metal carbonate which has been rendered catalytically inactive such as by overdrying caused by heating said carbonate at high temperatures for an extended period of time, i.e., drying the carbonate past the point which deprives it of the prerequisite amount of sorbed water that is necessary to impart catalytic activity to said carbonate, can be once again rendered catalytically active by mixing or slurrying the metal carbonate in water and subsequently drying same to the point where it essentially reaches the free-flowing powdery stage.

Furthermore, when the divalent metal carbonates are significantly catalytically activated by virtue of the contained sorbed water, the polymerization reaction is capable of being initiated within a reasonable time and at a reasonable rate. The time lag noted prior to the initiation of the polymerization reaction is generally known as the induction period. In general, the polymerization reaction is initiated within a reasonable time and at a reasonable rate when the minimum quantity of sorbed water is preferably above about 0.1 weight percent, based on the weight of the divalent metal carbonate catalyst. The upper limit regarding the amount of sorbed water which the catalyst can contain is a natural limit depending, to a great extent, on various factors such as those previously discussed.

As previously indicated the water associated with the catalytic activity of the metal carbonates is sorbed water. Non-sorbed water or extraneous water does not directly effect the catalytic activity of the metal carbonate catalyst; however, non-sorbed water or extraneous water present with the catalyst or contained in the monomeric reagents can inordinately prolong the induction period or the initiation of the polymerization reaction. Consequently, it is highly desirable to minimize the quantity of non-sorbed water present in the charge comprising catalyst and monomeric reagents. Factors which influence the amount of non-sorbed water to be tolerated in a particular system in order to obtain optimum operative conditions are, for example, the particular metal carbonate employed, the particle size of the metal carbonate, the monomeric reagent(s) employed, the method by which the metal carbonate was prepared, and other considerations. Generally, satisfactory polymerization rates are obtained when the quantity of non-sorbed water or extraneous water present in the charge comprising catalyst and monomeric reagents does not exceed about 1 weight percent, preferably about 0.5 weight percent, based on the weight of monomeric reagent(s); however, higher quantities of non-sorbed water can be present but, as stated previously, the induction period may be inordinately increased. Consequently, it is highly preferred that the metal carbonate catalyzed polymerization be inducted under substantially anhydrous conditions.

It has also been observed that certain adsorbed or occluded ions such as oxygenated and "thio-oxygen" anions tend to markedly decrease the catalytic activity of the metal carbonate catalyst. A notable exception is the sulfate ion. On the other hand, adsorbed or occluded chloride, cyanide or acetate ions do not appear to deleteriously affect the catalytic activity of the metal carbonates. It is further desirable that the divalent metal carbonates be prepared in the absence of nitrate ion, chlorate ion, thiosulfate ion, or tetraborate ion since the substantial presence of these ions can result in considerably long induction periods. However, thoroughly water-washing the divalent metal carbonates prepared in the presence of the above-illustrated interfering ions will serve to essentially remove these ions.

The "exposure activated" alkaline earth metal alcoholates represent a fourth class of compounds which effectively catalyze the polymerization reaction. Prior to "exposure activation," the alkaline earth metal alcoholates are represented by the following formula:

(IX)            RO—M—OR wherein M is an alkaline earth metal, i.e., strontium, calcium, or barium; and wherein each R variable can be considered to be derived from the same or different mono- or polyhydroxy organic compounds such as, for example, alkanols, cycloalkanols, alkylene glycols, or phenols. It is to be understood, of course, that when R is a polyhydroxy organic compound, each M valence also can be separately bonded through two different hydroxyl oxygens of the same R moiety, i.e.,

and thus R also may or may not have free hydroxyl groups (—OH) attached thereto.

The organic portion of the alkaline earth metal alcoholates can be derived, for example, from primary, secondary, and tertiary alkanols and cycloalkanols, e.g., methanol, ethanol, n-propanol, isobutanol, n-pentanol, isopentanol, n-hexanol, dodecanol, 2-ethylhexanol, 2,2-dimethyloctanol, benzyl alcohol, 2-phenylethanol, diphenylcarbinol, pentaerylthritol, cyclopentanol, cyclohexanol, 4-butylcyclohexanol, 3-octylcyclopentanol, cycloheptanol, and the like; from mono- and polyalkylene glycols, e.g., ethylene glycol, propylene glycol, the butanediols, the pentanediols, 2-methyl-2,3-butanediol, 2-ethyl-1,6-hexanediol, 4,5-octanediol, 1,9-nonanediol, glycerol, β-methylglycerol, diethylene glycol, dipropylene glycol, dibutylene glycol, dipentylene glycol, dihexylene glycol, and the like; from monoalkyl and monoaryl ethers of mono- and polyalkylene glycols, e.g., 2-methoxyethanol, 2-ethoxyethanol, 2-butoxyethanol, 2-benzyloxyethanol, 3-propoxypanol, 4-hexoxybutanol, 6-benzyloxyhexanol, 2 - (β - methoxyethoxy)ethanol, 2-(β-butoxyethoxy)ethanol. 3-(β-ethoxypropoxy)propanol, 4-(β-hexoxybutoxy)butanol, and the like; from mono- and polyhydroxy-containing aromatic and polyaromatic (including fused aromatic) hydrocarbons, e.g., phenol, resorcinol, catechol, pyrogallol, the cresols, alkyl-substituted phenol, the xylenols, 2,2'-, 2,4'-, 3,3'-, and 4,4'-dihydroxybiphenol, the naphthols, the naphthalenediols, and the like. The organic portion of the alkaline earth metal alcoholates also can be derived from organic compounds containing both alcoholic hydroxyl and phenolic hydroxy groups.

Enhanced catalytic activity is imparted to the alkaline earth metal alcoholate upon moderate exposure to carbon dioxide and water. Such exposure results in a weight increase of the alkaline earth metal alcoholate and consequently, this weight increase provides a convenient measure of the optimum exposure of said alcoholate to water and carbon dioxide. In general, it is desirable to expose the alkaline earth metal alcoholates, for example, to moist carbon dioxide until a gain of at least about 5.0 weight percent, based on the weight of said metal alcoholate prior to the exposure treatment, is observed. However, excessive exposure of the alkaline earth metal alcoholates to carbon dioxide and water can result in a decrease of the catlytic activity of said metal alcoholates. The desirable upper limit regarding weight percent gain in the metal alcoholate upon exposure to carbon dioxide and water will depend, in the main on the particular alkaline earth metal alcoholate contemplated. It has been observed that alkaline earth metal alcoholates in which the organic portion is derived from lower saturated aliphatic alcohols, e.g., methanol and ethanol, require less exposure (or less weight gain), than is the case when the organic portion is derived from, for example, n-hexanol, 2-butoxyethanol, alkylene glycols, and the like, to provide enhanced catalytic activity. Other factors which can affect this upper limit regarding weight gain on exposure to carbon dioxide and water are, for-example, the method by which the metal alcoholate was prepared, the surface area of the metal alcoholate, and other considerations.

The preceding described catalysts are employed in catalytically significant quantities, and, in general, a catalyst concentration in the range of from about 0.01 to about 10 weight percent, and higher, based on the total weight of monomeric material, is suitable. A catalyst concentration of from about 0.1 to about 3.0 weight percent is preferred. For optimum results, the particular catalyst employed, its preparation, its surface area, the nature of the monomeric reagent(s), the operative temperature at which the polymerization reaction is conducted, and other factors will largely determine the desired catalyst concentration.

The polymerization reaction can be conducted over a wide temperature range. Preferably, the polymerization reaction is conducted at a temperature in the range of from about 20°, and lower, to about 150° C., and higher, and more preferably from about 50° C. to about 120° C. As a practical matter, the choice of the particular temperature at which to effect the polymerization reaction depends, to an extent, on the nature of the monomer reagent(s) and particular catalyst employed, the concentration of the catalyst, and the like.

In general, the reaction time will vary depending on the operative temperature, the nature of the monomeric oxide reagent(s) employed, the particular catalyst and the concentration employed, the use of an inert organic diluent, and other factors. The reaction time can be as short as a few hours in duration or it can be as long as several days.

The polymers of this invention can be prepared via the bulk polymerization, suspension polymerization, or the solution polymerization routes. The polymerization reaction can be carried out in the presence of an inert organic diluent such as, for example, aromatic solvents, e.g., benzene, toluene, xylene, ethylbenzene, chlorobenzene, and the like; various oxygenated organic compounds such as anisole, the dimethyl and diethyl ethers of ethylene glycol, of propylene glycol, of diethylene glycol and the like; normally-liquid saturated hydrocarbons including the open chain, cyclic, and alkylsubstituted cyclic saturated hydrocarbons such as pentane, hexane, heptane, various normally-liquid petroleum hydrocarbon fractions, cyclohexane, the alkylcyclohexanes, decahydronaphthalene, and the like.

When polymerizing an admixture which contains an N-(2,3-epoxypropyl)tertiary amine and a vicinal-epoxy hydrocarbon, the concentration of said N-(2,3-epoxypropyl)tertiary amine can be varied over an extremely wide range. Preferably the concentration of either the N-(2,3-epoxypropyl)tertiary amine monomer or the vicinal-epoxy hydrocarbon monomer is in the range of from about 5 to about 95 weight percent, based on the total weight of said monomers. In a preferred aspect the novel copolymer products comprise from about 5 to 95 weight percent of N-(2,3-epoxypropyl)tertiary amine in copolymerized form with from about 95 to 5 weight percent of vicinal-epoxy hydrocarbon, based on the total weight of chemically combined monomers. In a further preferred aspect the novel copolymer products comprise from about 50 to 95 weight percent of vicinal-epoxy hydrocarbon in copolymerized form with from about 50 to 5 weight percent of N-(2,3-epoxypropyl)tertiary amine. Copolymers comprising a lower olefin oxide in copolymerized form with an N-(2,3-epoxypropyl)-tertiary amine are highly preferred. Those copolymers comprising ethylene oxide in copolymerized form with an N-(2,3-epoxypropyl)tertiary amine are most preferred.

Unreacted monomeric reagent oftentimes can be recovered from the reaction product by conventional techniques such as by heating said reaction product under reduced pressure. The polymer product also can be recovered from the reaction product by washing said reaction product with an inert, normally-liquid organic diluent, and subsequently drying same under reduced pressure at slightly elevated temperatures. Another route involves dissolution in a first inert organic solvent, followed by the addition of a second inert organic solvent which is miscible with the first solvent but which is a non-solvent for the polymer product. Recovery of the precipitated polymer can be effected by filtration, decantation, etc., followed by drying same as indicated previously. If desired, the polymer is freed of contained catalyst, e.g., the organometallic of Group II and III metals, by adding water to the polymer or the polymer solution, removing the resulting metal oxide or metal hydroxide precipitate via filtration, and subsequently evaporating the solution. However, when the polymer is water-soluble, it can be freed of organometallic residue by extraction with dilute mineral acid such as hydrochloric acid.

The novel homopolymers and copolymers of this invention are a useful class of polymeric compounds. These polymers can range from viscous liquids to hard, solid materials. The novel polymers can be used as solvents, lubricants, sizes, additives, vehicles and intermediates in the rubber, cosmetic, agriculture, textile, paint, and other industries. The water-insoluble solid copolymers, e.g., a copolymer containing 85 weight percent of propylene oxide in copolymerized form with 15 weight percent of N-(2,3-epoxypropyl)-diethylamine, etc., are useful for the production of various shaped articles such as brush handles, buttons, lamp bases, and the like. The water-soluble and water-insoluble solid copolymers can be used as viscosity thickeners in aqueous and organic media, respectively, thus having utility in paint formulations and paint removal formulations. The water-soluble and water-insoluble solid copolymers are also useful in the preparation of films by conventional techniques such as by milling on a two roll mill, calendering, solvent casting, and the like. In addition, as pointed out previously, the instant invention is admirably suited for the preparation of "tailor-made" copolymers whose water-solubility or water-insolubility characteristic play a dominant role in the ultimate end use of the copolymer. For example, should a water-soluble, solid copolymer be desired for a particular field of application, e.g., in the preparation of films from aqueous solution, in the preparation of coatings, and the like, the monomeric charge to a particular polymerization system can be adjusted so that a copolymer comprising a major proportion of ethylene oxide and a minor proportion of N-(2,3-epoxypropyl)tertiary amine is prepared. This water-solubility characteristic of the copolymer becomes more pronounced when one prepares copolymers containing proportionately greater amounts of ethylene oxide. Conversely, copolymers comprising a minor proportion of ethylene oxide and a major proportion of N-(2,3-epoxypropyl)tertiary amine are substantially water-insoluble. It is readily apparent from the preceding discussion that the novel polymers of this invention have a variety of uses.

In some of the illustrative examples to follow, the polymeric product is described as possessing a certain reduced viscosity value. By this term, i.e., "reduced viscosity," is meant a value obtained by dividing the specific viscosity by the concentration of the polymer in the solution, the concentration being measured in grams of polymer per 100 milliliters of solvent at a given temperature. The specific viscosity is obtained by dividing the difference between the viscosity of the solution and the viscosity of the solvent by the viscosity of the solvent. The reduced viscosity value is an indication of the molecular weight of the polymer. Unless otherwise indicated, the reduced viscosity value is determined at a concentration of 0.2 gram of polymer per 100 milliliters of solvent, i.e., benzene or acetonitrile, at 30° C.

The relative copolymerization rate of ethylene oxide or propylene oxide with 2,3-epoxypropyl groups has been determined to be about 1.5 and 1.0, respectively. The copolymers which were prepared in the following illustrative examples agree with this relative rate data.

In the following illustrative examples, the polymerization reactions were conducted under an inert atmosphere, i.e., nitrogen.

EXAMPLE 1

Strontium metal (50 grams, cut into small pieces) was placed into a two-liter flask equipped with a nitrogen inlet and vent (for the nitrogen), condenser, and feed tank. The strontium metal was washed with 150 cc. of high purity methanol under a nitrogen atmosphere. The wash methanol was removed from the flask by suction, and discarded. Fresh methanol (600 cc.), introduced into the flask, under stirring, was allowed to react with the strontium metal over a period of about 2 hours. The resulting precipitate was recovered by filtration under a nitrogen atmosphere. The strontium methylate product was catalytically active.

EXAMPLE 2

Strontium metal (22 grams) was dissolved in 500 milliliters of liquid ammonia. To the resulting solution there was slowly added a solution of 16 grams of ethylene glycol in 200 milliliters of liquid ammonia, under continuous stirring. Subsequently, the ammonia was allowed to weather off for a period of 16 to 18 hours until a dry, grayish-white product remained. The resulting product, strontium glycoxide, was pulverized to a finely-divided powdery state under a nitrogen atmosphere, and subsequently, this powdery product was divided into several portions. Each portion, except the control, was individually placed into a desiccator and moist carbon dioxide, generated by bubbling carbon dioxide through a water bubbler, was introduced into the desiccator (maintained at approximately 25° C.) for varying periods of time. These exposed strontium glycoxides were catalytically active. Other pertinent data are disclosed in Table I below.

*Table I*

| Sample Number | Catalyst [1] | Exposure Time, Hours | Weight Percent Gain [2] |
|---|---|---|---|
| 1 | Strontium glycoxide | 0.00 | ------ |
| 2 | ----do---- | 0.25 | 7.5 |
| 3 | ----do---- | 0.5 | 10.9 |
| 4 | ----do---- | 1.0 | 19.1 |
| 5 | ----do---- | 2.0 | 40.4 |
| 6 | ----do---- | 3.0 | 46.5 |
| 7 | ----do---- | 5.0 | 53.6 |
| 8 | ----do---- | 5.5 | 58.6 |

[1] Exposed to moist carbon dioxide as indicated.
[2] Based on the weight of strontium glycoxide prior to exposure to moist carbon dioxide.

EXAMPLE 3

Barium metal (34.4 grams) was dissolved in 1,000 milliliters of liquid ammonia. To the resulting solution there was slowly added a solution of 37.1 grams of n-butanol in 300 milliliters of liquid ammonia under continuous stirring. Subsequently, the ammonia was allowed to weather off for a period of 16 to 18 hours until a dry, grayish-white product remained. The resulting product, barium butylate, was pulverized to a finely-divided powdery state under a nitrogen atmosphere, and subsequently, this powdery product was divided into several portions. Each portion, except the control, was individually placed into a desiccator and moist carbon dioxide, generated by bubbling carbon dioxide through a water bubbler, was introduced into the desiccator (maintained at approximately 25° C.) for varying periods of time. These exposed barium methylates were catalytically active. Other pertinent data are disclosed in Table II below.

*Table II*

| Sample Number | Catalyst [1] | Exposure Time, Hours | Weight Percent Gain [2] |
|---|---|---|---|
| 1 | Barium butylate | 0.00 | ------ |
| 2 | ----do---- | 0.17 | 8.6 |
| 3 | ----do---- | 0.5 | 7.1 |
| 4 | ----do---- | 0.00 | ------ |
| 5 | ----do---- | 0.08 | 14 |

[1] Exposed to moist carbon dioxide as indicated.
[2] Based on the weight of barium butylate prior to exposure to moist carbon dioxide.

EXAMPLE 4

Calcium metal (20 grams) was dissolved in 1,500 milliliters of liquid ammonia. To the resulting solution there was slowly added a solution of 29.4 grams of ethylene glycol in 400 milliliters of liquid ammonia under continuous stirring. Subsequently, the ammonia was allowed to weather off for a period of 16 to 18 hours until a dry, grayish-white product remained. The resulting product, calcium glycoxide, was pulverized to a finely-divided powdery state under a nitrogen atmosphere, and subsequently, this powdery product was divided into several portions. Each portion except the control, was individually placed into a desiccator and moist carbon dioxide, generated by bubbling carbon dioxide through a water bubbler, was introduced into the desiccator (maintained at approximately 25° C.) for varying periods of time. These exposed calcium glycoxides were catalytically active. Other pertinent data are disclosed in Table III below.

*Table III*

| Sample Number | Catalyst [1] | Exposure Time, Hours | Weight Percent Gain [2] |
|---|---|---|---|
| 1 | Calcium glycoxide | 0.00 | ------ |
| 2 | ----do---- | 0.08 | 6.3 |
| 3 | ----do---- | 0.17 | 13.6 |
| 4 | ----do---- | 0.5 | 22.6 |
| 5 | ----do---- | 1.0 | 26.0 |
| 6 | ----do---- | 3.0 | 57.8 |

[1] Exposed to moist carbon dioxide as indicated.
[2] Based on the weight of calcium glycoxide prior to exposure to moist carbon dioxide.

EXAMPLE 5

Calcium metal (10 grams) is dissolved in 350 milliliters of liquid ammonia. To the resulting solution there is slowly added a solution 15.5 grams of ethylene glycol in 350 milliliters of liquid ammonia under continuous stirring. Subsequently, the mmonia is allowed to weather off for a period of 16 to 18 hours. The resulting grayish-white product then is pulverized, under a nitrogen atmosphere, to a finely-divided powdery state. This powdery product is spread on a petri dish which is then inserted into a desiccator. Moist carbon dioxide, generated by bubbling carbon dioxide through a water bubbler, is then introduced into the desiccator via a gas inlet conduit, said desiccator being maintained at about 25° C. The powdery product is exposed to this treatment for about 3 to 4 hours until there is a weight increase of between about 46 to 56 percent in said powdery product. Subsequently, said exposed product is placed under vacuum (3 to 5 mm. of Hg) at a temperature of about 57° C. for a period of about 2 to 3 hours until there is a weight loss of about 18 to 26 percent. The activated calcium glycoxide thus produced is catalytically active.

EXAMPLE 6

Strontium carbonate was precipitated by bubbling carbon dioxide into an aqueous solution of strontium hydroxide octahydrate. The precipitated strontium carbonate was recovered by filtration and subsequently, various samples thereof were heated at different temperatures. One sample was heated at 55° C. until the strontium carbonate contained about 1.5 weight percent sorbed water; a second sample was heated at 120° C. until the strontium carbonate contained about 1.0 weight percent sorbed water; and a third sample was heated at 200° C. until the strontium carbonate contained about 0.5 weight percent sorbed water. All three of these samples were observed to be active catalysts.

EXAMPLE 7

A solution of 10.6 grams of sodium carbonate in 200 milliliters of distilled water was slowly poured into a stirred solution of 24.4 grams of barium chloride dihydrate dissolved in 1 liter of distilled water. The precipitated barium carbonate was collected and dried at 120° C. for 93 hours. Barium carbonate prepared in this manner was an active catalyst.

EXAMPLE 8

Liquid ammonia (2 liters) was added to a 3-liter glass resin flask (maintained in a Dry Ice-acetone bath, the temperature of which was below the boiling point of liquid ammonia) while avoiding exposure to the atmosphere. Ethylene oxide (10 grams) was then dissolved in the stirred liquid ammonia. Subsequently, calcium metal nodules (100 grams) was added to the ethylene oxide-ammonia solution over a 15-minute period while stirring was continued. The flask was allowed to stand overnight exposed to room temperature conditions (approximately 20°-22° C.) while the ammonia weathered off. The solid product was transferred at room temperature, in a nitrogen filled "dry box," to a one-gallon stainless steel container half filled with glass marbles. Two liters of heptane were added to said container which was then agitated in a reciprocating paint shaker for one hour thus producing a slurry or suspension in heptane. This slurry containing calcium amide-ethylate was catalytically active.

EXAMPLE 9

Calcium metal (10 grams) and 150 milliliters of diethyl ether of diethylene glycol were charged to a 500 milliliter, 3-necked flask equipped with stirrer, blow-off vent, and gas-delivery tube. The flask was immersed in an ice bath, and the temperature of the resulting reaction was maintained at 0° to 5° C. The mixture was stirred vigorously and ammonia was bubbled into the flask for about 5.25 hours during which period of time a finely-divided gold suspension was formed. Subsequently, 5 grams of propylene oxide was slowly added to the resulting suspension over a period of about 5 to 10 minutes. During the addition of the propylene oxide, the suspension changed from gold in color to grayish blue. On titration, the calmium contained of the suspension was found to be 0.125 gram of calcium per 5 milliliters of suspension. This suspension was found to be catalytically active.

EXAMPLE 10

To a 3-necked flask equipped with stirrer, blow-off vent, and gas-delivery tube, there were charged 10 grams of calcium metal and 150 milliliters of diethyl ether of diethylene glycol. The flask was then immersed in an ice bath and the temperature of the resulting mixture was maintained at 0° to 5° C. The suspension of calcium in the diethyl ether diethylene glycol was vigorously stirred while ammonia was bubbled through same for a period of 6 hours thus forming a calcium hexammoniate suspension. To this suspension 17.5 grams of butylene oxide (an isomeric mixture of 1,2-epoxybutane and 2,3-epoxybutane boiling between 60° and 62° C.) were added very slowly over a period of about 10 minutes. During the addition of butylene oxide the temperature of the resulting admixture rose to 23° C.; there resulted a grayish-blue suspension. The resulting suspension was catalytically active.

EXAMPLE 11

To a Pyrex tube there were charged 0.001 part by weight of exposure activated calcium glycoxide, 90 parts by weight of ethylene oxide, and 10 parts by weight of N-(2,3-epoxypropyl)-N-phenyl-methylamine. The exposure activated calcium glycoxide was prepared in the manner set forth in Example 5 supra. After treatment with moist carbon dioxide, the calcium glycoxide had a weight gain of approximately 50 percent; upon drying (under reduced pressure at about 57° C.) a weight loss of about 10 to 15 percent was observed in the exposure activated calcium glycoxide. The tube was sealed and inserted into an aluminum block which was gently agitated. The reaction temperature was about 90° C.; a copolymerization rate of approximately 1.1 percent per hour was noted. Subsequently, the reaction product mixture was cooled to about 25° C., the tube was broken open, and the reaction product mixture was washed with about 100 milliliters of hexane, followed by drying the resulting polymeric product. There was obtained a solid copolymer which had a reduced viscosity value of about 2.9 in acetonitrile. The yield was essentially quantitative. This copolymeric product was soluble in water; no water-insoluble fraction was observed.

EXAMPLE 12

To a Pyrex tube there were charged 0.001 part by weight of exposure activated calcium glycoxide, 80 parts by weight of ethylene oxide, and 20 parts by weight of N-(2,3-epoxypropyl)-N-phenyl-methylamine. The exposure activated calcium glycoxide was prepared in the manner set forth in Example 5 supra. After treatment with moist carbon dioxide, the calcium glycoxide had a weight of approximately 50 percent; upon drying (under reduced pressure at about 57° C.) a weight loss of about 10 to 15 percent was observed in the exposure activated calcium glycoxide. The tube was sealed and inserted into an aluminum block which was gently agitated. The reaction temperature was about 90° C.; a copolymerization rate of approximately 1.1 percent per hour was noted. Subsequently, the reaction product mixture was cooled to about 25° C., the tube was broken open, and the reaction product mixture was washed with about 100 milliliters of hexane, followed by drying the resulting polymeric product. There was obtained a solid copolymer which had a reduced viscosity value of about 1.5 in acetonitrile. The yield was essentially quantitative. This copolymeric product was soluble in water; no water-insoluble fraction was observed.

EXAMPLE 13

To a stainless steel autoclave there were charged 0.05 part by weight of exposure activated calcium glycoxide, 200 parts by weight of toluene, 95 parts by weight of ethylene oxide, and 5 parts by weight of N-(2,3-epoxypropyl)-2-methyl-5-ethylpiperidine. The exposure activated calcium glycoxide was prepared in the manner set forth in Example 5 supra. After treatment with moist carbon dioxide, the calcium glycoxide had a weight gain of approximately 50 percent; upon drying (under reduced pressure at about 57° C.) a weight loss of about 10 to 15 percent was observed in the exposure activated calcium glycoxide. The resulting admixture was heated to a temperature of about 110° C. and maintained thereat for about 20 hours. A copolymerization rate of approximately 4.2 percent per hour was observed. The autoclave was cooled to room temperature, i.e., approximately 25° C., and subsequently, 500 parts by weight of hexane was added thereto thus precipitating the copolymer product. The product was recovered and dried under reduced pressure at about 30° C. There was obtained a solid copolymer which had a reduced viscosity value of about 0.13 in acetonitrile. The yield was 86 percent. This copolymeric product was water-soluble; no water-insoluble fraction was observed.

When an equivalent amount of N-(2,3-epoxypropyl)-N-benzyl-N-octylamine is substituted for N-(2,3-epoxypropyl)-2-methyl-5-ethylpiperidine in the above reaction, a solid, water-soluble copolymer is obtained.

EXAMPLE 14

To a stainless steel autoclave there is charged 0.01 gram of barium methylate, 35 grams of propylene oxide, and 65 grams of N-(2,3-epoxypropyl)-dimethylamine. The resulting admixture is then heated to 100° C. for a period of approximately 24 hours. The autoclave then is cooled to room temperature, i.e., approximately 25° C., and the reaction product mixture is washed with about 500 grams of hexane. The resulting product is dried under reduced pressure at about 30° C. There is obtained a solid, water-insoluble copolymer.

EXAMPLE 15

To a stainless steel autoclave there is charged 0.5 gram of strontium 2-ethylhexylate, 25 grams of 2,3-epoxy-pentane, and 75 grams of N-(2,3-epoxypropyl)-N-benzyl-n-octylamine. The resulting admixture is heated to 100° C. for a period of approximately 32 hours. The autoclave then is cooled to room temperature, i.e., approximately 25° C., and the reaction product mixture is washed with about 500 grams of hexane. The resulting product is dried under reduced pressure at about 30° C. There is obtained a solid, water-insoluble copolymer.

EXAMPLE 16

To a Pyrex tube, there were charged 3 grams of an admixture which contained 95 weight percent of ethylene oxide and 5 weight percent of N-(2,3-epoxypropyl)-diethylamine, and 0.2 gram of zinc carbonate (contained approximately 11 weight percent of sorbed water). The tube was sealed and inserted into an aluminum block which was gently agitated for a period of 96 hours at 90° C. After this period of time the reaction product mixture was cooled to about 25° C., the tube was broken open, and the reaction product mixture was washed with about 100 milliliters of hexane. After this, the resulting product was dried under reduced pressure at 25° C. for a period of about 16 hours. There were obtained 3 grams of a yellow powdery, solid copolymer which had a reduced viscosity value of 0.2 in acetonitrile. The resulting copolymeric product analyzed 0.36 percent nitrogen. This product was soluble in water; no water-insoluble fraction was observed.

EXAMPLE 17

To a Pyrex tube, there were charged 3 grams of an admixture which contained 85 weight percent of butylene oxide and 15 weight percent of N-(2,3-epoxypropyl)-diethylamine, and 0.2 gram of exposure activated calcium glycoxide (prepared in a manner similar to that set forth in Example 5 supra). The tube was sealed and inserted into an aluminum block which was gently agitated for a period of 16 days at 90° C. After this period of time the reaction product mixture was cooled to about 25° C., the tube was broken open, and the reaction product mixture was washed with about 100 milliliters of hexane. After this, the resulting product was dried under reduced pressure (0.1 mm. of Hg) at 57° C. for a period of about 8 hours. There was obtained 0.5 gram of a brown, viscous liquid which analyzed 2.27 percent nitrogen. This liquid copolymer was water-insoluble; no water-soluble fraction was observed.

When an equivalent amount of N-(2,3-epoxy-propyl)-N-ethyl-phenethylamine is substituted for N-(2,3-epoxypropyl)-diethylamine in the above reaction, a solid, water-insoluble copolymeric product is obtained.

EXAMPLE 18

To a Pyrex tube, there were charged 3 grams of an admixture which contained 65 weight percent of propylene oxide and 35 weight percent of N-(2,3-epoxypropyl)-diethylamine, and 0.2 gram of barium butylate. The tube was sealed and inserted into an aluminum block which was gently agitated for a period of 138 hours at 90° C. After this period of time the reaction product mixture was cooled to about 25° C., the tube was broken open, and the reaction product mixture was washed with about 100 milliliters of hexane. After this, the resulting product was dried under reduced pressure (0.1 mm. of Hg) at 57° C. for a period of about 8 hours. There were obtained 2 grams of a viscous oil which analyzed 2.84 percent nitrogen. This liquid copolymer was water-insoluble; no water-soluble fraction was observed.

When an equivalent amount of N-(2,3-epoxypropyl)-dibutylamine is substituted for N-(2,3-epoxypropyl)diethylamine in the above reaction, a water-insoluble copolymeric product is obtained.

EXAMPLE 19

To a Pyrex tube, there were charged 3 grams of an admixture which contained 55 weight percent of styrene oxide and 45 weight percent of N-(2,3-epoxypropyl)-diethylamine, and an amount of calcium amide-ethylate which contained 0.2 gram of contained calcium). The tube was sealed and rotated end over end for a period of 268 hours at 25° C. After this period of time the tube was broken open, and the reaction product mixture was washed with about 100 milliliters of hexane. After this, the resulting product was dried under reduced pressure at 25° C. for a period of about 16 hours. There were obtained 2.75 grams of a tan solid copolymer which had a reduced viscosity value of 0.036 in benzene. The resulting copolymeric product analyzed 6.35 percent nitrogen. This copolymeric product was water-insoluble; no water-soluble fraction was observed.

EXAMPLE 20

To a Pyrex tube, there were charged 3 grams of an admixture which contained 5 weight percent of cyclohexene oxide and 95 weight percent of N-(2,3-epoxypropyl)-diethyl amine, and 0.2 gram of dibutylzinc. The tube was sealed and inserted into an aluminum block which was gently agitated for a period of 89 hours at 90° C. After this period of time the reaction product mixture was cooled to about 25° C., the tube was broken open, and the reaction product mixture was washed with about 100 milliliters of hexane. After this, the resulting product was dried under reduced pressure at 25° C. for a period of about 16 hours. There were obtained 1.2 grams of a brown pasty solid copolymer which had a reduced viscosity value of 0.05 in benzene. The resulting copolymeric product analyzed 8.2 percent nitrogen. This copolymeric product was water-insoluble; no water-soluble fraction was observed.

EXAMPLE 21

To a Pyrex tube, three were charged 3 grams of an admixture which contained 35 weight percent of ethylene oxide and 65 weight percent of N-(2,3-epoxypropyl)-diethylamine, and 0.2 gram of triisoproproxyaluminum. The tube was sealed and inserted into an aluminum block which was gently agitated for a period of 124 hours at 90° C. After this period of time the reaction product mixture was cooled to about 25° C., the tube was broken open, and the reaction product mixture was washed with about 100 milliliters of hexane. After this, the resulting product was dried under reduced pressure at 25° C. for a period of about 16 hours. There were obtained 0.4 gram of a yellow solid copolymer which had a reduced viscosity value of 0.03 in benzene. The resulting copolymeric prouct analyzed 5.85 percent nitrogen. This copolymeric product was water-insoluble, no water-soluble fraction was observed.

EXAMPLE 22

To a Pyrex tube, there were charged 3 grams of N-(2,3-epoxypropyl)-diethylamine and 1.3 milliliters of calcium amide-ethylate suspended in heptane (contained 0.2 gram of calcium metal). The tube was sealed and inserted into an aluminum block which was gently agitated for a period of 66 hours at 90° C. After this period of time the reaction product mixture was cooled to about 25° C., the tube was broken open, and the reaction product mixture was washed with about 100 milliliters of hexane. After this, the resulting product was dried under reduced pressure at 25° C. for a period of about 16 hours. There was obtained 1.6 grams of a yellow, water-insoluble, solid homopolymer which had a reduced viscosity value of 0.15 in benzene.

In a similar manner, N-2,3-epoxypropyl)-N-phenyl-methylamine, N-(2,3-epoxypropyl)-2-methyl-5-ethylpiperidine, N-(2,3-epoxypropyl)-dibutylamine, and other N-(2,3-epoxypropyl)tertiary amines listed previously can be polymerized to useful compounds which range from water-insoluble viscous liquids to solid homopolymers.

EXAMPLE 23

To a Pyrex tube, there were charged 3 grams of N-(2,3-epoxypropyl)-diethylamine and 0.2 gram of triisobutyl-aluminum. The tube was sealed and inserted into an aluminum block which was gently agitated for a period of 70 hours at 90° C. After this period of time the reaction product mixture was cooled to about 25° C., the tube was broken open, and the reaction product mixture was washed with about 100 milliliters of hexane. After this, the resulting product was dried under reduced pressure at 25° C. for a period of about 16 hours. There were obtained 0.69 gram of an amber, water-insoluble, viscous liquid which had a reduced viscosity value of 0.03 in benzene.

EXAMPLE 24

To a Pyrex tube, there were charged 3 grams of N-(2,3-epoxypropyl)-diethylamine and 0.2 gram of triisopropoxy-aluminum. The tube was sealed and inserted into an aluminum block which as gently agitated for a period of 70 hours at 90° C. After this period of time the reaction product mixture was cooled to about 25° C., the tube was broken open, and the reaction product mixture was washed with about 100 milliliters of hexane. After this, the resulting product was dried under reduced pressure at 25° C. for a period of about 16 hours. There were obtained 3 grams of a brown, water-insoluble, viscous liquid which had a reduced viscosity value of 0.02 in benzene.

Although the invention has been illustrated by the preceding examples, the invention is not to be construed as limited to the materials employed in the above-said exemplary examples, but rather, the invention encompasses the generic area as hereinbefore disclosed. Various modifications and embodiments of this invention can be made without departing from the spirit and scope thereof.

What is claimed is:
1. A copolymer obtained by polymerizing ethylene oxide and N-(2,3-epoxypropyl)-2-methyl-5-ethylpiperidine.
2. A copolymer obtained by polymerizing propylene oxide and N-(2,3-epoxypropyl)-2-methyl-5-ethylpiperidine.
3. A copolymer obtained by polymerizing a mixture containing a saturated vicinal epoxy hydrocarbon having a single vicinal epoxy group and containing 2 to 4 carbon atoms and a compound selected from the group consisting of N-(2,3-epoxypropyl)piperidine and N-(2,3-epoxypropyl)alkylpiperidine.
4. The copolymer of claim 3 wherein the saturated vicinal epoxy hydrocarbon is ethylene oxide.
5. The copolymer of claim 3 wherein the saturated vicinal epoxy hydrocarbon is propylene oxide.
6. A copolymer obtained by polymerizing a mixture containing a saturated vicinal epoxy hydrocarbon having a single vicinal epoxy group and containing 2 to 4 carbon atoms and N-(2,3-epoxypropyl)piperidine.
7. A copolymer obtained by polymerizing a mixture containing a saturated vicinal epoxy hydrocarbon having a single vicinal epoxy group and containing from 2 to 4 carbon atoms and N-(2,3-epoxypropyl)alkylpiperidine.

References Cited in the file of this patent

UNITED STATES PATENTS

| | | |
|---|---|---|
| 1,790,042 | Eisleb | Jan. 27, 1931 |
| 2,498,195 | Ballard et al. | Feb. 21, 1950 |
| 2,897,178 | Hill | July 28, 1959 |
| 2,963,483 | Heywood | Dec. 6, 1960 |
| 3,063,948 | Bailey et al. | Nov. 13, 1962 |

FOREIGN PATENTS

| | | |
|---|---|---|
| 220,517 | Australia | Feb. 19, 1959 |
| 477,843 | Great Britain | Jan. 3, 1938 |

OTHER REFERENCES

K. A. Krasuski et al.: "Action of Piperidine and Piperazine on the -Oxides of Ethylene etc.," as reported in British Chemical Abstracts, 1929, page 1078.